(12) United States Patent
Qi et al.

(10) Patent No.: US 6,731,325 B1
(45) Date of Patent: May 4, 2004

(54) METHODS AND APPARATUS FOR SELECTING WIRE VIDEO SIZE

(75) Inventors: Emily H. Qi, Portland, OR (US); Stephen S. Ing, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/392,103

(22) Filed: Sep. 8, 1999

(51) Int. Cl.$^7$ ................................................ H04N 7/14
(52) U.S. Cl. .................. 348/14.12; 348/14.13
(58) Field of Search .................. 348/14.01–14.04, 348/14.07–14.13, 747; 382/232, 238–239; 725/137; 709/204; 370/260–261; 345/753; 375/240.03, 240.12, 240.25

(56) References Cited

U.S. PATENT DOCUMENTS

| | | | | | |
|---|---|---|---|---|---|
| 5,389,965 A | * | 2/1995 | Kuzma | ................... | 348/14.05 |
| 5,793,425 A | * | 8/1998 | Balakrishnan | ......... | 375/240.25 |
| 5,905,524 A | * | 5/1999 | Sauer | ......................... | 725/137 |
| 5,983,263 A | * | 11/1999 | Rothrock et al. | ........... | 709/204 |
| 6,263,020 B1 | * | 7/2001 | Gardos et al. | ......... | 375/240.03 |
| 6,317,459 B1 | * | 11/2001 | Wang | ................... | 375/240.12 |
| 6,330,369 B1 | * | 12/2001 | Cornog et al. | .............. | 382/239 |
| 6,377,818 B2 | * | 4/2002 | Irube et al. | .............. | 348/14.01 |

* cited by examiner

*Primary Examiner*—George Eng
(74) *Attorney, Agent, or Firm*—Schwegman, Lundberg, Woessner & Kluth, P.A.

(57) ABSTRACT

A method and apparatus select the wire video size and capture video size of a video telephony product depending upon the desired remote video size. A target frame rate is taken into account when choosing the wire video size and capture video size. Wire video size is chosen as close to the desired remote video size as possible. To provide high quality, the video capture frame rate and capture video sizes are maintained above a predetermined level.

32 Claims, 3 Drawing Sheets

METHODS AND APPARATUS FOR SELECTING WIRE VIDEO SIZE

TECHNICAL FIELD

Embodiments of the present invention relate to video conferencing and, more specifically, to correlating remote viewing and local video capture.

BACKGROUND INFORMATION

Video conferencing and video telephone applications have been advancing with great speed in the past several years. With the increase in global business, it has become increasingly more difficult to engage in face to face meetings with business contacts, clients, and the like. In some measure, the use of the telephone and electronic mail (E-mail) communication has served to cover the gap. However, face to face meetings can still convey more information about the participants than E-mail and telephonic communications. Because of the desire to engage in face to face meetings with contacts, video conferencing has become increasingly more popular.

Video conferencing requires apparatus at each location of the conference to allow the participants to have video captured and transmitted to the other location for viewing. The quality of video transmitted and viewed depends on a number of factors, including the size of the picture a viewer sees, and the frame rate of the transmission. A lower frame rate results in more flicker and non-fluid movements. A smaller picture size makes it more difficult to see images and details of images. Frame rates and video size depend on the expected bandwidth of the transmission, the processing speed of any processor processing the transmitted video, and the capabilities of the capture and display devices.

Often, remote viewing devices and local video capture devices have different specifications and capabilities, and cannot necessarily display the same capture video size. Even if the same capture video size is available, the frame rate for one of the devices may be far lower than the expected frame rate in the application. Such video capture mismatches lead to problems with transmissions that must be dealt with to ensure quality video communication. When video capture devices differ, and video size or frame rates do not match between two end points, it is time consuming and frustrating to attempt to match capabilities.

One method of matching capabilities is to stretch the video image at one of the video conference locations. That is, if a back-end viewing device cannot provide an adequate frame rate for a certain video size, the size is reduced at the back-end, and transmitted to the front-end at the smaller size. The video is then stretched at the front-end video device, allowing display of the video at the desired size and frame rate, but with a reduced quality picture. In other words, the image size at the front-end viewing device is increased from its transmitted size, which is smaller than the desired remote video size.

In many instances, the viewer of the remote viewing device video will determine the capture video size of the front-end or local device, and the wire video size for transmission of video between the two devices. It would be desirable to improve the selection of video sizes to increase the quality of remote video. It would a similarly be desirable to select capture video size and wire video size taking into account the capabilities of the local video viewing device.

SUMMARY

In one embodiment, a method for choosing the wire video size of a video telephony product includes deriving a wire video size from a desired remote video size of a remote viewing device, and choosing a remote viewing target frame rate. A determination is made as to whether the chosen wire video size has a capture frame rate less than a threshold percentage of a maximum frame rate of the remote viewing device and a capture video size less than a threshold percentage of a maximum stretch of the wire video size. If the capture frame rate or capture video size are less than the threshold percentage of the maximum frame rate or the threshold percentage of the maximum stretch of the wire video size, a smaller wire video size is selected, and choosing a target frame rate through determining if a smaller wire video size is selected are repeated.

In another embodiment, a video conferencing station includes a host video conferencing device having a video capture device, a transmission device for transmitting video, and a central processing unit. A computer readable medium capable of execution by the central processing unit causes the central processing unit to execute a method as described above. Other methods may also be executed.

Other embodiments are described and claimed.

DESCRIPTION OF EMBODIMENTS

Figure 1:
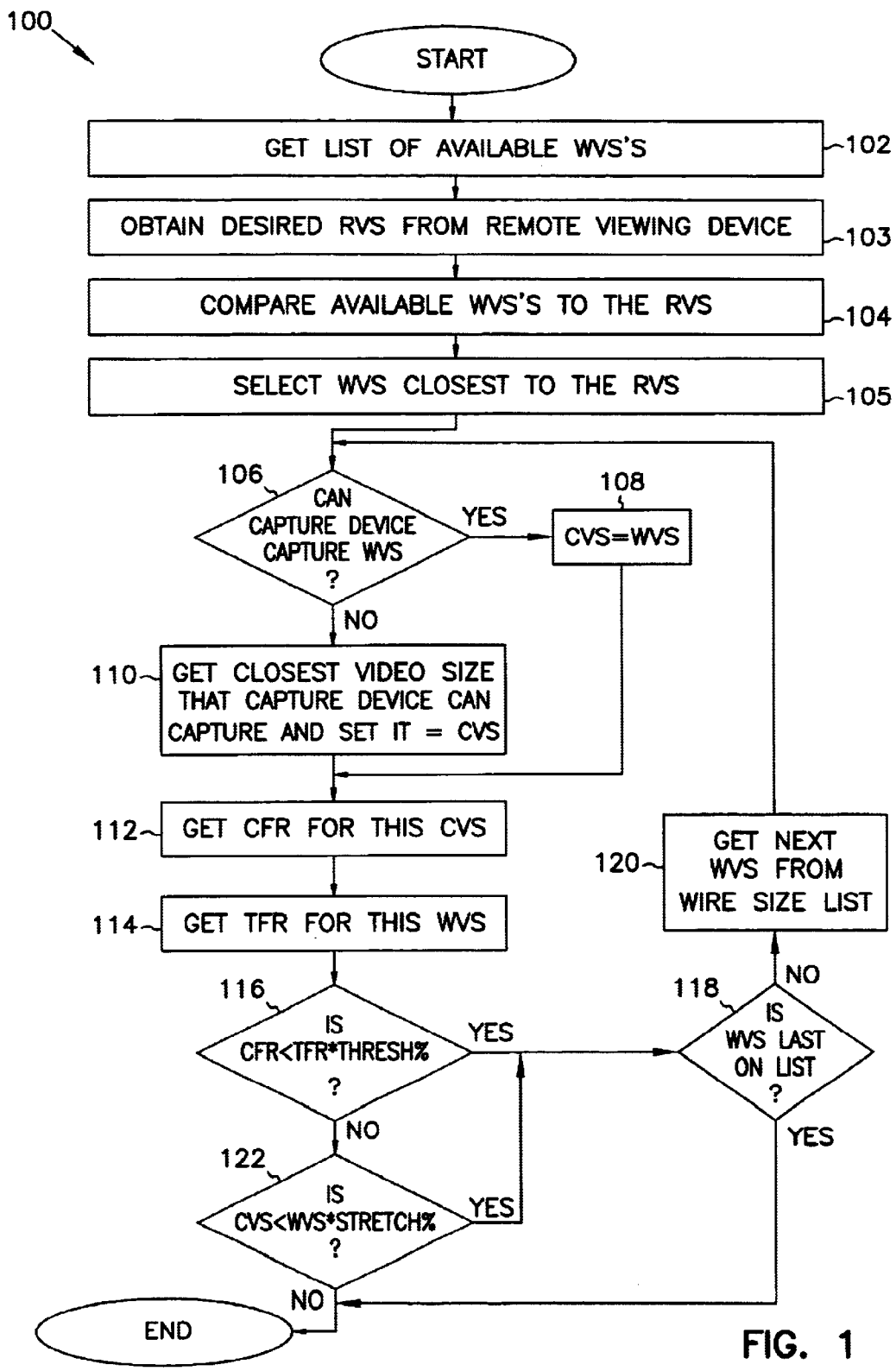
FIG. 1 is a flow chart diagram of a method according to one embodiment of the invention.

In the following detailed description of sample embodiments, reference is made to the accompanying drawings which form a part hereof, and in which are shown by way of illustration, but not of limitation, specific embodiments in which the invention may be practiced. These embodiments are described in sufficient detail to enable those skilled in the art to practice embodiments of the invention, and it is to be understood that other embodiments may be utilized and logical, structural, electrical, and other changes may be made without departing from the scope of the present disclosure.

Some portions of the detailed descriptions which follow are presented in terms of algorithms and symbolic representations of operations on data bits within a computer or processor memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present disclosure, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Standard video telephony products have a number of parameters which are used in the capture, transmission, and display of video. Video signals are captured by a capture device such as a video camera or the like. Each capture device has a range of capture sizes and different capture frame rates at each capture size.

Three different video sizes are utilized in the various embodiments of the invention. They are the capture video size (CVS) which is used for video capture at the transmission endpoint or local video telephony product, the wire video size (WVS) which is used for video transmission between the local and remote devices, and the remote video size (RVS) which is the video size at which the user at a remote video device wishes to display transmitted video. The RVS is typically the determining factor, as RVS is chosen by the user at the remote location. The chosen RVS may require a change in either or both of the CVS and WVS of the local video telephony product. Remote video size may also be referred to as requested video size or required video size.

Ideally, in a video conferencing application, CVS=WVS=RVS. However, due to the large numbers and capabilities of video telephony products, such a match is not always possible. The International Telecommunication Union (ITU), which is a specialized agency of the United Nations, has set certain standards for video compression. A common video compression standard, ITU-T Recommendation H.263, March, 1996 (hereinafter "H.263"), supports only certain video sizes. Such video sizes include Common Intermediate Format (CIF), Quarter CIF-(QCIF), sub-QCIF (SQCIF), and the like. In such an instance, the WVS is limited to the group of sizes supported by H.263. Different standards allow different wire video sizes. For example, a revised H.263 standard, ITU-T H.263 Version 2, January, 1998 (hereinafter "H.263+") coder/decoder system for digital transmission includes wire video sizes of any multiple of 4 by any multiple of 4, for example, 356×288, 320×240, or the like.

FIG. 1 is a flow chart diagram of a method 100 of choosing a wire video size (WVS) and a capture video size (CVS) for a local video telephony product according to one embodiment of the invention. The method allows the choice of the combination of WVS, RVS, and CVS to provide temporal video quality closest to ideal given the parameters of the equipment in use. Method 100 comprises retrieving a list of available WVS's for a video capture device of a local or host video telephony product in block 102, and setting the WVS initially to the RVS desired by a remote viewing device of a remote video telephony product.

The operation of setting or deriving the WVS includes obtaining the desired RVS from the remote viewing device in block 103, comparing available WVS's to the RVS in block 104, and selecting the WVS closest to the RVS in block 105.

The capture video size (CVS) is chosen next. To choose a CVS, a determination is made in block 106 whether the local video telephony product can capture the initially set WVS. If the local telephony product can capture the initially set WVS, then the CVS of the local telephony product is set to the WVS in block 108, and process flow continues at block 112. If the local telephony product cannot capture the initially set WVS, then the closest video size the local telephony product can capture, given the initially set WVS, is chosen in block 110, and process flow continues at block 112.

In block 112, the capture frame rate (CFR) for the CVS is obtained. In block 114, the target frame rate (TFR) for the chosen WVS is obtained. To determine the best match between the local and remote video telephony devices, certain conditions should be met. The TFR for the chosen WVS is determined based on the expected communication bandwidth between the local and remote devices, and on the central processing unit (CPU) speed of the remote device.

To provide the best quality video for the chosen parameters of the method 100, the CFR should be greater than or equal to a predetermined percentage of the TFR. That is, the TFR is adjusted to a predetermined percentage of the TFR by multiplying the TFR by a maximum frame rate percentage (MaxFR threshold) to determine a frame rate above which it is desired that the CFR remain. In decision block 116, a determination is made as to whether the CFR is less than the TFR multiplied by the MaxFR threshold. The MaxFR threshold may be set as a predetermined percentage, or may be chosen by the users of the video telephony products to require a specific quality for the video transmission. If the CFR is less than the TFR multiplied by the MaxFR threshold, then process flow continues at block 118. If the CFR is not less than the TFR multiplied by the MaxFR threshold, then process flow continues at decision block 122.

In decision block 118, a determination is made as to whether the currently set WVS is the last WVS in the list of available WVS's obtained in block 102. If the currently set WVS is the last WVS on the list of available WVS's, then process flow is complete, and the current parameters in the method 100 are utilized in video transmission. If the currently set WVS is not the last WVS on the list of available WVS's, then in one embodiment another WVS from the list of WVS's is chosen as the current WVS. In another embodiment, the new WVS is selected to be the next available WVS which is smaller than the current WVS. Process flow continues at block 106.

To provide the best quality video for the chosen parameters of the method 100, the CVS should be,greater than or equal to a predetermined percentage of the WVS. That is, the WVS is adjusted to a predetermined percentage of the WVS by multiplying the WVS by a maximum stretch percentage (MaxStretch threshold) to determine a video size above which it is desired that the CVS remain. If the CVS is not less than the WVS multiplied by the MaxStretch threshold in block 122, then process flow is complete, and the current parameters in the method 100 are utilized in video transmission. If the CVS is less than the WVS multiplied by the MaxStretch threshold in block 122, process flow continues at block 118.

Figure 2:
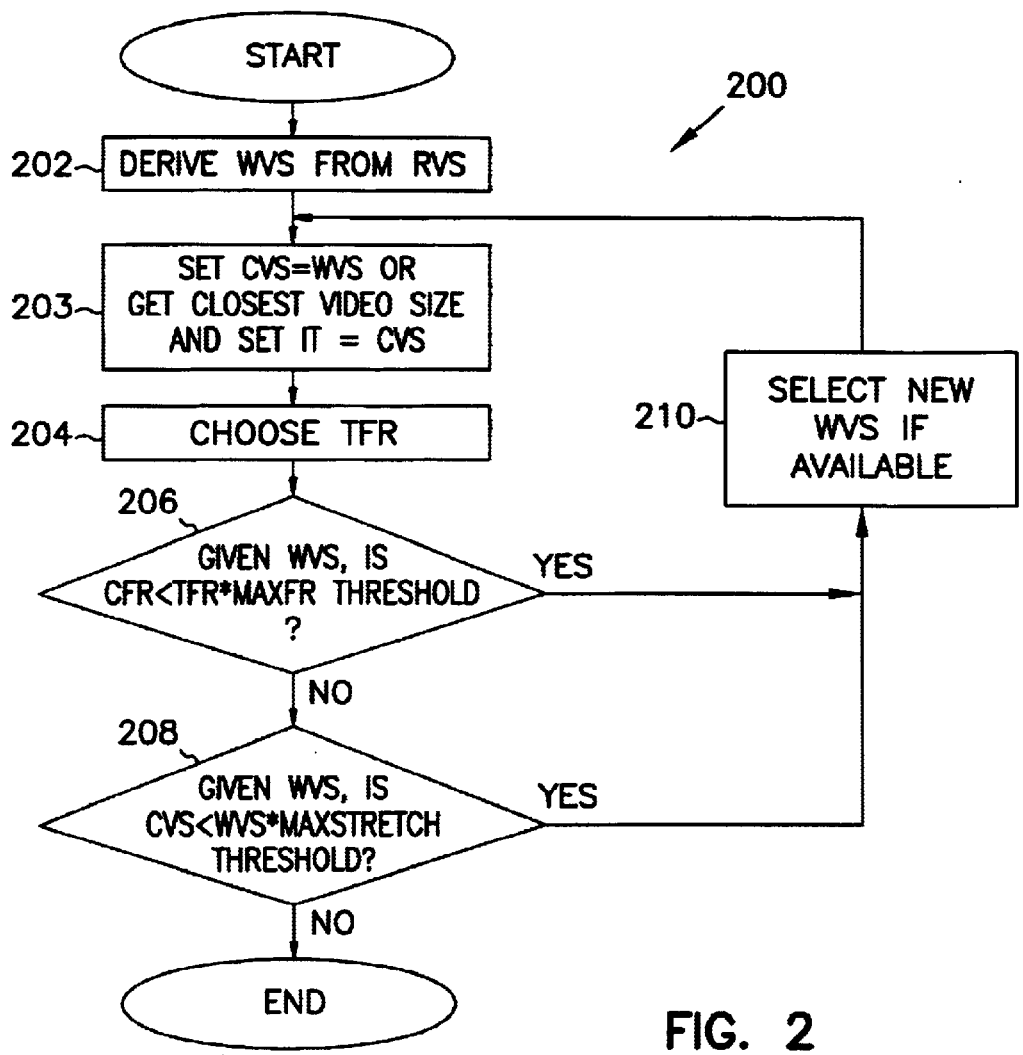
FIG. 2 is a flow chart diagram of a method according to another embodiment of the invention.

In another embodiment shown in FIG. 2, a method 200 of choosing a wire video size and a capture video size for a local video telephony product comprises deriving a WVS from a chosen RVS in block 202, setting the CVS equal to WVS or getting the closest video size and setting it equal to CVS in block 203, and choosing a TFR in block 204. The TFR is chosen in one embodiment by the remote viewer side of the video telephone system based on factors including the CPU speed of the remote video device and the expected bandwidth of the communication link between the remote and the local sites.

Given the selected WVS, a determination is made in decision block 206 as to whether the CFR is less than the TFR multiplied by the MaxFR threshold. If the CFR is less than the TFR multiplied by the MaxFR threshold, process flow continues at block 210. If not, process flow continues at decision block 208. In decision block 208, given the selected WVS, a determination is made as to whether the CVS is less than the WVS multiplied by the MaxStretch threshold. If the CVS is less than the WVS multiplied by the MaxStretch threshold, process flow continues at block 210. If not, process flow is complete and the current parameters in the method 200 are utilized in video transmission. In block 210, a new WvS is selected if another WVS is available, and process flow continues at block 203.

Figure 2A:
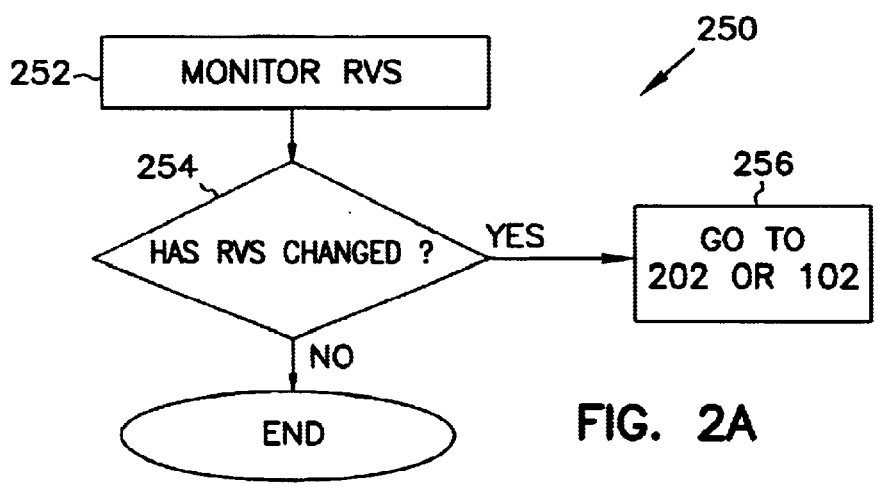
FIG. 2A is a flow chart diagram of a method according to yet another embodiment of the invention.

Optionally, in another embodiment 250, shown in FIG. 2A, the local video telephony product monitors the remote video size of the remote device in block 252, and if the RVS is changed by the remote video device as determined by decision block 254, the embodiments of methods 100 and 200 re-choose the wire video size in the manner set forth above. This is initiated at block 256. This dynamic setting of wire video sizes allows the local video telephony product to adapt to changing remote viewing conditions.

Figure 3:
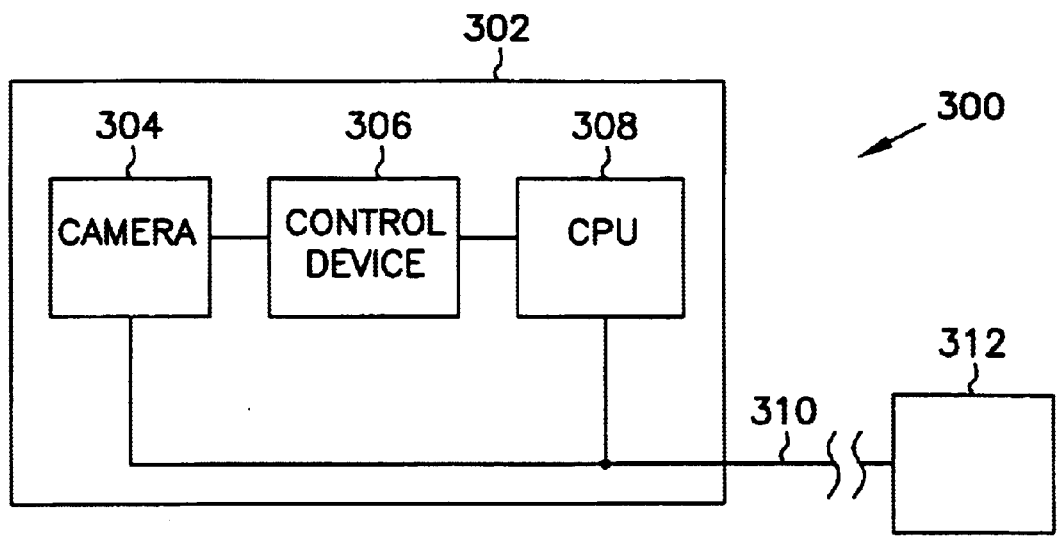
FIG. 3 is a block diagram of a video conferencing embodiment of the invention.

In another embodiment, shown in FIG. 3, a video telephony product 300 comprises a video conferencing station 302. Video conferencing station 302 comprises a video camera 304, control device 306, and CPU 308, all operatively connected. Control device 306 in one embodiment issues commands to the camera 304 and CPU 308 to effect a method such as methods 100 or 200. In another embodiment, control device 306 is integrated with CPU 308. In yet another embodiment, control device 306 comprises a computer program written to implement a method such as methods 100 or 200. Further, the video conferencing station 302 is connectable via a transmission link 310 to a second video conferencing station 312 to transmit video signals between the video conferencing stations 302 and 312. In one embodiment, the CPU 308 executes the methods 100 or 200 from memory (not shown) to perform the process flow of the methods.

Figure 4:
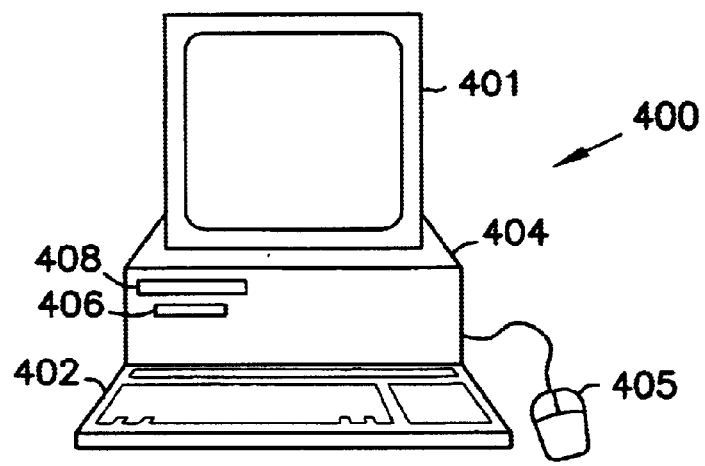
FIG. 4 is a block diagram of a computer system on which embodiments of the invention may be utilized.

In another embodiment, video phone software incorporates the, methods 100 or 200. Such video phone software may run on a computer such as personal computer 400 shown in FIG. 4. Computers as shown in FIG. 4, typically include a monitor 401, keyboard input 402, central processing unit 404, and a pointing or selection device such as mouse 405. Further components of a typical computer system may include a machine readable storage media such as disk drive 406, hard disk, CD-ROM 408, DVD, modem, and the like. The processor unit of such a computer typically includes a microprocessor, memory (RAM and ROM), and other peripheral circuitry, not shown.

While a desktop computer is shown in FIG. 4, portable or laptop computers can also utilize software embodying the methods of the present invention. Such computers are some of the types of host devices on which embodiments of the present invention may be employed.

Any video capture device capable of being used in a video telephony application may employ the methods and software described above. For example, video cameras may be used as video capture devices. The methods of the present invention are in one embodiment utilized to choose WVS and CVS for a digital camera. In another embodiment, a USB camera is utilized. It will be understood by those of skill in the art that other video capture devices are capable of use with the various embodiments of the present invention, and that such other video capture devices are within the scope of embodiments of the invention.

Other video compression standards are also amenable to use with the various embodiments of the present invention. These different standards may provide different available wire video sizes and capture video sizes. However, the various embodiments of the invention do not require a specific standard. Instead, any standard for video compression may be used with the embodiments of the invention.

The various embodiments of the invention provide methods and apparatus for choosing the CVS and WVS of a video telephony product to achieve a temporal video quality as close to the desired video quality as is possible given the parameters and capabilities of the video products used. Examples of products for which the methods may be utilized include Universal Serial Bus (USB) cameras, video cameras, digital cameras, video telephones, video phone software, video conferencing stations, and the like.

Further, it should be understood that the method embodiments of the present invention may also be used by a remote device wishing to transmit a video signal to a local device, and that such methods are within the scope of embodiments of the invention.

In certain embodiments of the invention, the methods 100 and 200 comprise computer programs written to derive the information and control the choosing of WVS and CVS for a video telephony product. The computer programs run on a central processing unit of the video telephony product, and may be transferred to memory from permanent storage via disk drive when stored on removable media or via a network connection or modem connection when stored outside of the video telephony product, or via other types of computer or machine readable medium from which it can be read and utilized. The computer programs comprise multiple modules or objects to perform the methods 100 and 200. The type of computer programming languages used to write the code may vary between procedural code type languages to object oriented languages.. The files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that embodiments of this invention be limited only by the following claims, and the full scope of equivalents thereof.

What is claimed is:

1. A method for choosing a wire video size (WVS) for a video telephony product, comprising:
   deriving a wire video size (WVS) from a remote video size of a remote viewing device;
   choosing a remote viewing device target frame rate;
   determining if the derived WVS has a capture frame rate less than a threshold percentage of a maximum frame rate of the remote viewing device and a capture video size less than a threshold percentage of a maximum stretch of the WVS;

selecting a new WVS if the capture frame rate is less than the threshold percentage of the maximum frame rate or if the capture video size is less than the threshold percentage of the maximum stretch of the WVS; and if a new WVS is selected, repeating choosing through determining.

2. The method of claim 1, wherein choosing a remote viewing device target frame rate is based on an expected bandwidth of a communication link to the remote viewing device and a processing speed of the remote viewing device.

3. The method of claim 1, wherein deriving a WVS comprises:

obtaining a list of available WVS's from a video capture device of a video telephony product;

obtaining the remote video size from the remote viewing device;

comparing available WVS's to the remote video size; and selecting the WVS closest to the remote video size.

4. The method of claim 3, wherein selecting the WVS closest to the remote video size further comprises selecting a WVS not exceeding the desired remote video size.

5. The method of claim 1, wherein selecting a new WVS comprises:

selecting a WVS from the remaining WVS's, wherein the new WVS is smaller than the current WVS.

6. The method of claim 1, wherein the recited operations are performed in a different order from the order in which they are recited in claim 1.

7. The method of claim 1, and further comprising:

monitoring the remote video size; and rechoosing the WVS if the remote video size changes.

8. A method for choosing a wire video size (WVS) for a video telephony product, comprising:

choosing a WVS from a WVS list;

choosing a capture video size (CVS) for the video telephony product;

obtaining a capture frame rate (CFR) for the chosen CVS based on the WVS;

determining a target frame rate for the chosen NVS;

determining whether the CFR is less than a predetermined maximum frame rate threshold;

determining whether the CVS is less than a predetermined maximum stretch threshold of the WVS; and setting the WVS to the CVS or the CFR is not less than the maximum frame rate threshold and if CVS is not less than the maximum stretch threshold.

9. The method of claim 8, wherein choosing a WVS comprises choosing the closest available WVS to a desired remote video size.

10. The method of claim 8, wherein choosing a CVS comprises:

determining whether the video telephony device can capture the chosen WVS;

setting the CVS to the WVS if the video telephony device can capture the chosen WVS, and setting the CVS to the closest WVS to the chosen WVS if the video telephony device cannot capture the chosen WVS.

11. The method or claim 8, wherein determining the target frame rate is based on an expected bandwidth of a communication link to the remote viewing device and a processing speed of the remote viewing device.

12. The method of claim 8, wherein the maximum frame rate threshold is a predetermined percentage of a maximum frame rate.

13. The method of claim 8, wherein the maximum stretch threshold is a predetermined percentage of a maximum stretch of the WVS.

14. The method of claim 8, wherein the recited operations are performed in a different order from the order in which they are recited in claim 8.

15. The method of claim 8, and further comprising:

monitoring the remote video size; and rechoosing the WVS if the remote video size changes.

16. A machine readable medium comprising machine readable instructions for performing a method comprising:

deriving a wire video size (WVS) from a desired remote video size of a remote viewing device;

choosing a remote viewing device target frame rate;

determining if the derived WVS has a capture frame rate less than a threshold percentage of a maximum frame rate of the remote viewing device and a capture video size less than a threshold percentage of a maximum stretch of the WVS;

selecting a new WVS if the capture frame rate is less than the threshold percentage of the maximum frame rate or if the capture video size is less than the threshold percentage of the maximum stretch of the WVS; and if a new WVS is selected, repeating choosing through determining.

17. The machine readable medium of claim 16, wherein deriving a WVS comprises:

obtaining a list of available WVS's from a video capture device of a video telephony product;

obtaining the desired remote video size from the remote viewing device;

comparing the available WVS's to the desired remote video size; and selecting the WVS closest to the desired remote video size.

18. The machine readable medium of claim 17, wherein selecting the WVS closest to the desired remote video size further comprises selecting a WVS not exceeding the desired remote video size.

19. A video conferencing station, comprising:

a host video conferencing device having a video capture device, a transmission device to transmit video, and a central processing unit; and a computer readable medium capable of execution by the central processing unit, the computer readable medium to cause the central processing unit to execute a method comprising:

deriving a wire video size (WVS) from a remote video size of a remote viewing device;

choosing a remote viewing device target frame rate based on expected bandwidth and processing speed of the remote viewing device;

determining if the derived WVS has a capture frame rate less than a threshold percentage of a maximum frame rate of the remote viewing device and a capture video size less than a threshold percentage of a maximum stretch of the WVS;

selecting a new WVS if the capture frame rate is less than the threshold percentage of the maximum frame rate or if the capture video size is less than the threshold percentage of the maximum stretch of the WVS; and if a new WVS is selected, repeating choosing through determining.

20. The video conferencing station of claim 19, wherein choosing a remote viewing device target frame rate is based on an expected bandwidth of a communication link to the remote viewing device and a processing speed of the remote viewing device.

21. The video conferencing station of claim 19, wherein deriving a WVS comprises:
  obtaining a list of available WVS's from the video capture device;
  obtaining the desired remote video size from the remote viewing device;
  comparing the available WVS's to the desired remote video size; and
  selecting the WVS closest to the desired remote video size.

22. The video conferencing station of claim 19, wherein selecting the WVS closest to the desired remote video size further comprises selecting a WVS not exceeding the desired remote video size.

23. The video conferencing station of claim 19, wherein selecting a new WVS comprises:
  selecting a WVS from the remaining WVS's, wherein the new WVS is smaller than the current WVS.

24. The video conferencing station of claim 19, wherein selecting a new WVS further comprises selecting a smaller available WVS.

25. The video conferencing station of claim 19, wherein the video capture device comprises a video phone.

26. The video conferencing station of claim 19, wherein the video capture device comprises a digital camera.

27. The video conferencing station of claim 19, wherein the video capture device comprises a video camera.

28. A method of choosing a wire video size (WVS) for video signals transmitted over a transmission link between a video capture device of a local video telephony product and a remote viewing device, comprising:
  monitoring by the local video telephony product of a remote video size chosen by the remote viewing device; and
  choosing the wire video size (WVS) based on the remote video size, wherein choosing the WVS includes:
  deriving a WVS from a remote video size of the remote viewing device;
  choosing a remote viewing device target frame rate;
  determining if the derived WVS has a capture frame rate less than a threshold percentage of a maximum frame rate of the remote viewing device and a capture video size less than a threshold percentage of a maximum stretch of the WVS;
  selecting a new WVS if the capture frame rate is less than the threshold percentage of the maximum frame rate or if the capture video size is less than the threshold percentage of the maximum stretch of the WVS; and
  if a new WVS is selected, repeating choosing through determining.

29. The method of claim 28, and further comprising:
  rechoosing the WVS if the remote video size changes.

30. A method of choosing a wire video size (WVS) for a local telephony product, comprising:
  monitoring by the local video telephony product of a remote video size chosen by a remote viewing device;
  deriving the wire video size (WVS) from the remote video size of the remote viewing device;
  choosing a remote viewing device target frame rate;
  determining if the derived WVS has a capture frame rate less than a threshold percentage of a maximum frame rate of the remote viewing device and a capture video size less than a threshold percentage of a maximum stretch of the WVS;
  selecting a new WVS if the capture frame rate is less than the threshold percentage of the maximum frame rate or if the capture video size is less than the threshold percentage of the maximum stretch of the WVS; and
  if a new WVS is selected, repeating choosing through determining.

31. The method of claim 30, wherein choosing a remote viewing device target frame rate is based on an expected bandwidth of a communication link to the remote viewing device and a processing speed of the remote viewing device.

32. The method of claim 30, wherein deriving a WVS comprises:
  obtaining a list of available WVS's from a video capture device of the local video telephony product;
  obtaining the remote video size from the remote viewing device;
  comparing available WVS's to the remote video size; and
  selecting the WVS closest to the remote video size.

* * * * *

UNITED STATES PATENT AND TRADEMARK OFFICE
CERTIFICATE OF CORRECTION

PATENT NO. : 6,731,325 B1
DATED : May 4, 2004
INVENTOR(S) : Qi et al.

It is certified that error appears in the above-identified patent and that said Letters Patent is hereby corrected as shown below:

Column 7,
Line 40, delete "NVS" and insert -- WVS --.
Line 46, delete "or" and insert -- if --.
Line 57, delete "," and insert -- ; --.
Line 61, delete "or" and insert -- of --.

Column 10,
Lines 15 and 17, delete "the" and insert -- a --.

Signed and Sealed this

Fourteenth Day of February, 2006

JON W. DUDAS
*Director of the United States Patent and Trademark Office*